June 4, 1963 A. J. POISSON 3,092,245

PACKAGE FOR MINIATURE ELECTRICAL COMPONENTS

Filed Dec. 29, 1960

INVENTOR.
ARTHUR J. POISSON

BY Elber J. Hyde
ATTORNEY

United States Patent Office 3,092,245 Patented June 4, 1963

3,092,245
PACKAGE FOR MINIATURE ELECTRICAL COMPONENTS

Arthur J. Poisson, Concord, Mass., assignor to Clevite Corporation, a corporation of Ohio Filed Dec. 29, 1960, Ser. No. 79,393
1 Claim. (Cl. 206—45.31)

This invention relates to a package for the storage of small electrical components and particularly miniature glass diodes in bent lead form.

One of the primary objects of this invention is to simplify packaging of miniature diodes and to provide a package which lends itself to automated loading thereof.

Another object of this invention is to prevent comingling of the diodes by providing a package wherein the electrical components may be center spaced by means of automatic machinery.

Another object of this invention is to provide a package in which the diodes are stored in multiple units on a soft pad with means permitting easy severance of a portion of the pad on which a group of diodes is secured.

Another object of this invention is to provide a package which has a plurality of transparent windows to enable a visual inspection of the color code of the diodes without removal of the cover box.

In the prior art it has been the practice to store miniature components such as diodes in bags containing polyethylene. The diodes are put at random into the bag. As a result the leads of the diodes get scratched and entangled and it is very difficult to maintain satisfactory tolerances. As a consequence, a substantial percentage of such units must be discarded.

These difficulties are overcome and the foregoing objects are accomplished in the preferred embodiment by the provision of a package for glass diodes having bent end leads, and comprising a pad of plastic foam constructed and arranged to receive and to frictionally grip portions of the end leads. An elongated box of substantially rectangular cross-section encloses the pad and comprises a top and a bottom support, the box has an end opening and an end flap, the end flap is integrally connected with one of the supports and is disposed adjacent to the opening to cover the same. The flap provides a resilient cushion by extending through the opening and therebeyond extending an intermediate portion which is parallel to the normal plane of one of the supports and an end portion which is perpendicular with respect to the latter.

Other and further objects of the present invention will be apparent from the following description of a preferred embodiment thereof, illustrated in the accompanying drawing.

Figure 1:
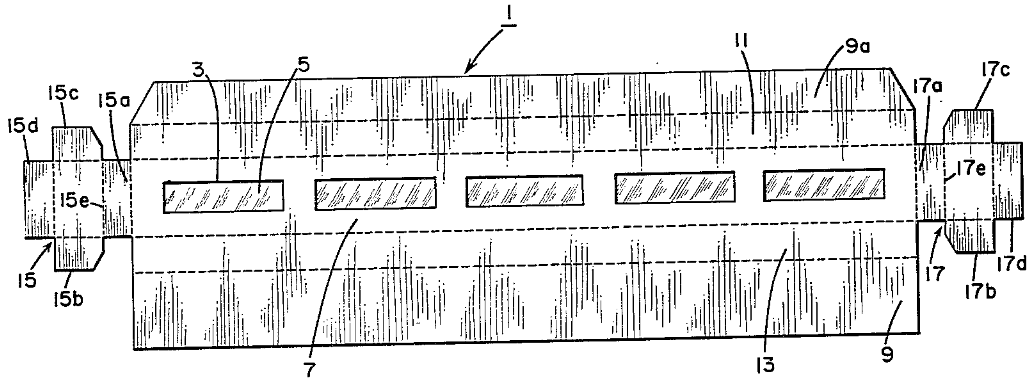
FIGURE 1 is a plan view of the box constructed in accordance with the invention.
Figure 2:
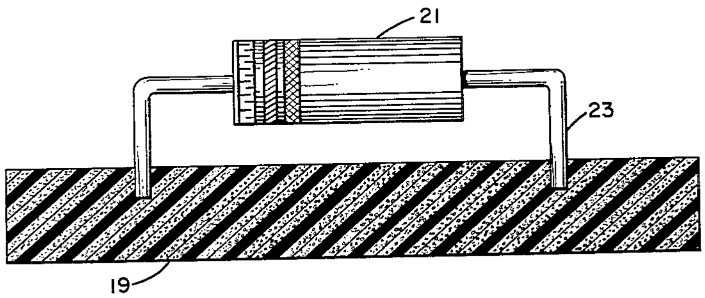
FIGURE 2 is a partly cross-sectional view of the pad and a perspective view of the bent lead sub-miniature diode.

Referring now to the drawing, numeral 1 designates a sheet of light material possessed of suitable resiliency so that it may be readily stamped to form a box-like structure as hereinafter described. Heavy paper or light weight cardboard of appropriate quality may be advantageously employed.

The sheet 1 is stamped as shown, see FIGURE 1, and at spaced points along the center a number of rectangular openings 3 are provided to enable a visual inspection of the box. The openings 3 are then suitably covered by a sheet of transparent material 5 applied over the openings from the inner side of the sheet.

The sheet 1 is suitably folded along the crease or folding lines illustrated to form a structure having a rectangular cross-section. Sections 7 and 9 (9*a*) form the top and bottom portion, the box includes oppositely spaced side walls 11 and 13, and oppositely arranged end flaps 15 and 17.

The transverse lengths across the top section 7 is arranged to equal the width of a plastic foam pad 19 which is suitably enclosed by the box. Correspondingly, the height of the side wall is suitably selected to comfortably house the pad 19 and diodes 21, the latter of which extends axially bent end leads 23 which are received in the pad.

Figure 3:
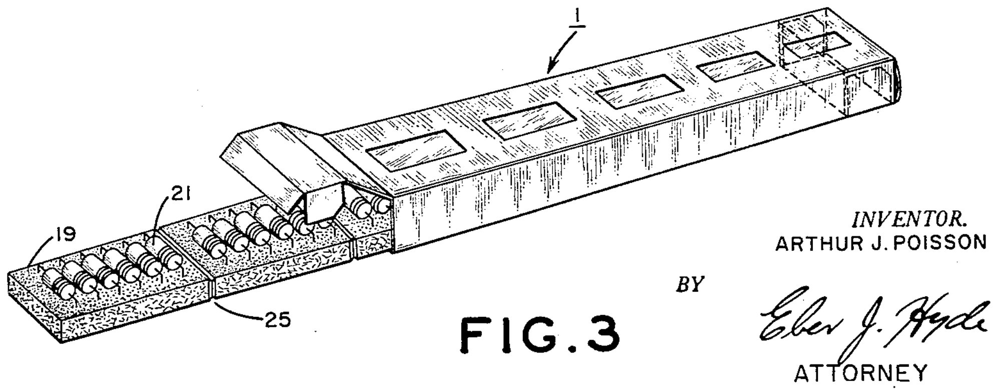
FIGURE 3 shows in perspective the package including portions of the pad to which miniature components are attached.

To construct the box-like structure shown in FIGURE 3, from the flat sheet 1 as illustrated in FIGURE 1, the side walls 11 and 13 are bent along the crease lines in a vertical direction and the bottom sections 9 and 9*a* are then folded to form the horizontally illustrated box support. In this position the bottom support 9 will overlap bottom section 9*a* and the two are then connected to each other by means of glue or other conventional means. The end flaps 15 and 17 are also provided with a line of fold, as shown, and the end flaps are bent vertically to form an end cover which can be folded and unfolded to open and close the ends of the box. More particularly, to assemble the end flaps each flap is bent downwardly at the crease line 15*a* (17*a*) and thereafter outwardly projecting ears 15*b* and 15*c* (17*b* and 17*c*) are folded inwardly and then outer end 15*d* (17*d*) is bent about 90° thereby creating a little enclosure as shown in FIGURE 3. The same is squeezed into and between supports 7 and 9 by suitably folding the end flaps at crease line 15*e* (17*e*). In this position each end flap constitutes a little resilient box with shock absorbing qualities with respect to the pad which abuts thereagainst.

The pad 19 is formed of a plastic foam, such as polystyrene which permits the end leads 23 of the glass diodes 21 to be inserted into the pads at which time the plastic foam frictionally grips the inserted portions of the leads 23. The pad has a substantially rectangular cross-section and a groove 25, see FIGURE 3, extends transversely, i.e., with respect to the major axis of the pad, and peripherally around the pad to provide a relatively weakened cross-section. This permits grouping of the diodes, with the groove extending between each group, so that the pad may be readily divided and a portion of the pad may be severed and taken out of the box along with the diodes mounted thereon.

The box may be loaded with the pad at any time before or after constructing the box-like structure 1.

While there have been described what at present are considered to be the preferred embodiments of this invention, it will be obvious to those skilled in the art that various changes and modifications may be made therein without departing from the invention, and it is aimed, therefore, in the appended claim to cover all such changes and modifications as fall within the true spirit and scope of the invention.

I claim as my invention:

A package of miniature electrical components having a substantially cylindrical body and extending leads from each end of said body, each of said leads having a right angle bent with the terminal portions thereof parallel to each other; a pad of rigid plastic foam receiving and frictionally gripping the terminal portions of each lead, said pad having a substantially rectangular cross section and a groove extending peripherally around said pad for providing a relatively weakened cross section; an elongated box having top, bottom and side walls forming in combination a hollow enclosure of rectangular cross section with two end openings and a window-like opening in said top wall, first and second foldable end flaps integral with one of said walls, one of said flaps being located proximate to one end opening and the other flap being located proximate to the other end opening, each flap having an end cover contiguous to the last named walls for closing each end opening, an intermediate member integral with said end cover and disposed parallel to the normal plane of said top and bottom walls and including two outwardly projecting ears located at opposite ends of said intermediate member and disposed within said enclosure parallel to the normal plane of said side wall and at right angle to the top and bottom wall and each of said flaps including a resilient abutment member constructed integral with the intermediate member and arranged in the same plane as the end cover; and a sheet of transparent material covering said window-like opening.

References Cited in the file of this patent

UNITED STATES PATENTS

| | | |
|---|---|---|
| 2,339,555 | Glass | Jan. 18, 1944 |
| 2,459,568 | Lyon | Jan. 18, 1949 |
| 2,518,450 | Cowen | Aug. 15, 1950 |
| 2,682,949 | Whitehead | July 6, 1954 |
| 2,755,982 | Vander Lust | July 24, 1956 |
| 2,924,371 | Frankenstein | Feb. 9, 1960 |
| 2,971,637 | Simons | Feb. 14, 1961 |